United States Patent [19]

Levien

[11] Patent Number: 4,756,198

[45] Date of Patent: Jul. 12, 1988

[54] SENSOR APPARATUS FOR MASS FLOW RATE MEASUREMENT SYSTEM

[75] Inventor: Andrew K. Levien, Menlo Park, Calif.

[73] Assignee: Exac Corporation, Campbell, Calif.

[21] Appl. No.: 13,768

[22] Filed: Feb. 12, 1987

Related U.S. Application Data

[63] Continuation-in-part of Ser. No. 822,123, Jan. 24, 1986, abandoned.

[51] Int. Cl.$^4$ .............................................. G01E 1/84
[52] U.S. Cl. .................................................. 73/861.38
[58] Field of Search .......................... 73/861.37, 861.38

[56] References Cited

U.S. PATENT DOCUMENTS

| | | | |
|---|---|---|---|
| 4,422,338 | 12/1983 | Smith | 73/861.38 |
| 4,491,025 | 1/1985 | Smith et al. | 73/861.38 |
| 4,660,421 | 4/1987 | Dahlin et al. | 73/861.38 |

Primary Examiner—Herbert Goldstein
Attorney, Agent, or Firm—Rosenblum, Parish & Bacigalupi

[57] ABSTRACT

A dual-tube Coriolis flow meter is disclosed in which each tube is formed into a loop and the loops are connected either in series or in parallel flow relationship to allow each loop to accept at least a portion of the flow in a flow line. The loops are elongated in the direction of the flow line. A drive means is disposed between the tubes at a point between the loop extremities and opposite the cross-over points of the loops. Small permanent magnets are attached to each loop to interact with the drive means to impart oppositely directed drive forces to the two loops. Sensors are positioned at the extremities of the loops and include electromagnetic sensing windings carried by the base and disposed between the loops. Pairs of small permanent magnets are carried by each loop end and create magnetic fields which are cut by arcuate portions of the windings to induce signals in the windings that are proportional to the relative motions of the loop ends. The sensitivity of the device may be improved by coupling a resilient linking member between the loop at their drive points. The linking member has the effect of increasing the spring constants of the loops in the drive mode without affecting the spring constants in the Coriolis mode.

18 Claims, 5 Drawing Sheets

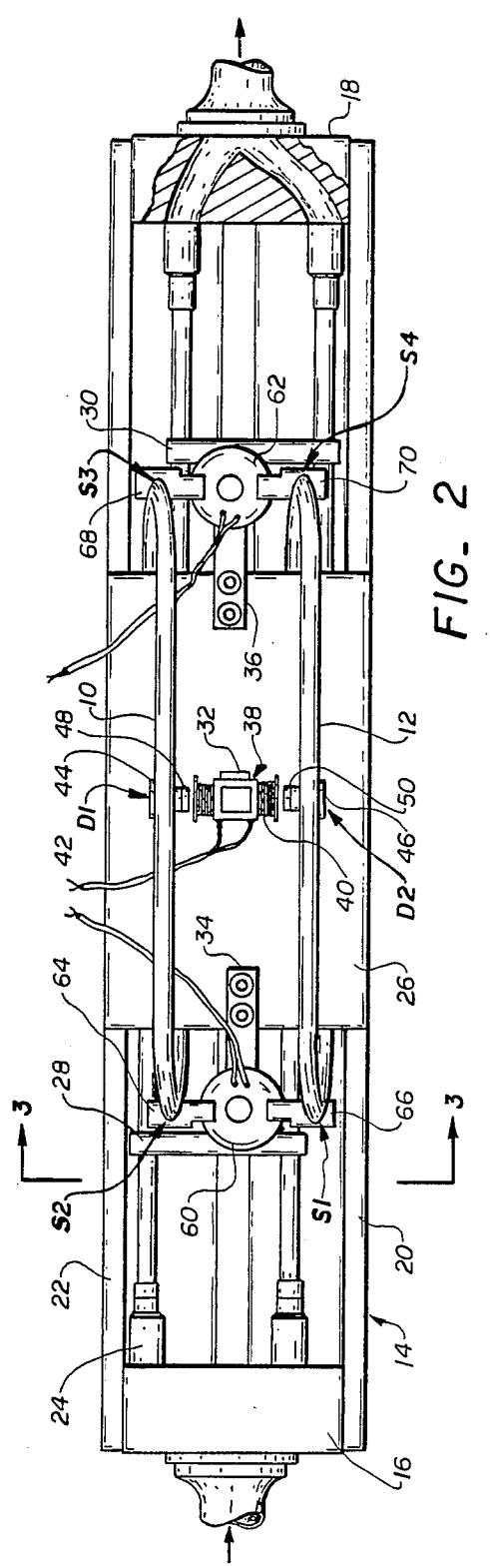

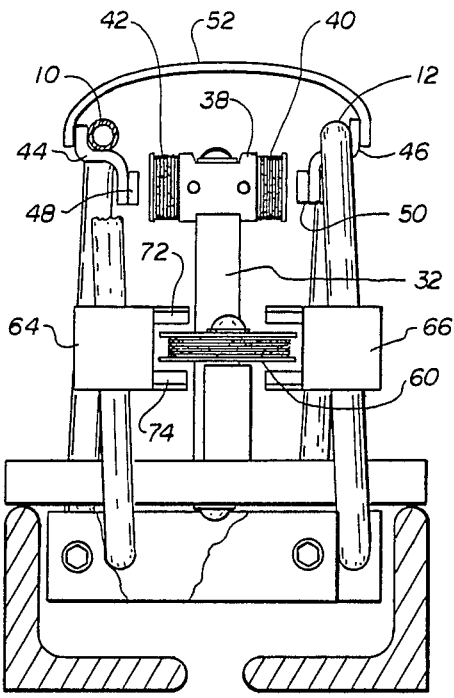
FIG. 7
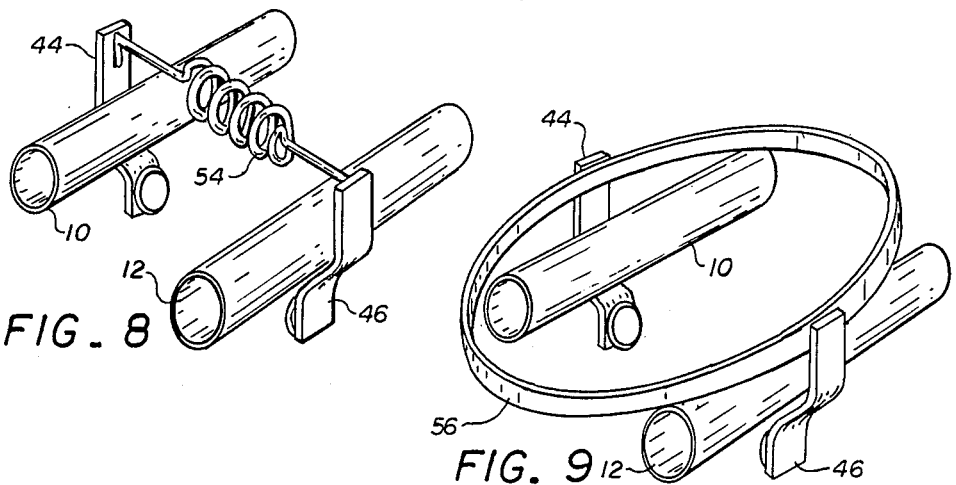
FIG. 8
FIG. 9

SENSOR APPARATUS FOR MASS FLOW RATE MEASUREMENT SYSTEM

RELATED APPLICATIONS

This application is a continuation-in-part of copending U.S. application Ser. No. 822,123, filed Jan. 24, 1986, now abandoned, and entitled "Improved Sensor Apparatus For Mass Flow Rate Measurement System".

This application is also related to the copending application entitled "Apparatus for Mass Flow Rate and Density Measurement" Ser. No. 775,739, filed Sept. 13, 1985, now U.S. Pat. No. 4,711,132, and the copending application entitled "Improved Apparatus for Mass Flow Rate and Density Measurement" Ser. No. 777,707, filed Sept. 13, 1985, now U.S. Pat. No. 4,660,421, both of which are assigned to the assignee of the present invention. The entire disclosures of the above applications are incorporated by reference into the present application.

BACKGROUND OF THE INVENTION

1. Field of the Invention

The present invention relates generally to mass flow rate and density measuring apparatus, and more particularly to an improved flow rate sensor including means for substantially improving the sensitivity of the device.

2. Description of Prior Art

Numerous attempts have been made in the last twenty years or so to provide Coriolis type mass flow rate sensing apparatus in which various configurations of straight tubes, U-shaped tubes, looped tubes, etc., have been either rotated or oscillated in a controlled manner such that Coriolis induced deflection can be measured (or the effects of such deflections can be measured) as an indication of mass flow rate through the tubes. An extensive listing of prior art patents relating to Coriolis devices is given in the U.S. patent to James E. Smith, U.S. Pat. No. Re. 31,450, which issued Nov. 29, 1983.

As is well pointed out in the Smith, Cox and Sipin Patents listed in the above reference, certain asdvantages can be obtained by constructing the sensor device in a tuning fork configuration and driving the device at a frequency at or near the resonant frequency in the "drive mode" thereof. The Smith U.S. Pats. No. 4,187,721; U.S. Pat. No. Re. 31,450, and U.S. Pat. No. 4,422,338 teach tuning fork structures in which a single conduit forms one arm of the tuning fork, and a resilient spring arm forms the second element of the tuning fork. In such structures, the resilient U-shaped conduit through which the mass to be sensed flows is vibrated against the resilient arm. In other prior art patents of Smith (U.S. Pat. No. 4,252,028) and Cox (U.S. Pat. Nos. 4,127,028; 4,192,184 and 4,311,054), a second U-shaped tube is substituted for the spring arm and the two tubes are driven relative to each other. In both types of structures a magnet is affixed to one of the arms and a magnetic driving means is affixed to the other for interacting with the magnet and applying driving forces between the two tubes.

Similarly, in both types of structures, in order to sense Coriolis induced distortion between the tubes, flags or magnets are similarly affixed to points on one of the tubes and sensing detectors or coils are correspondingly affixed to the other tube such that relative motion therebetween is sensed by the EMF induced in the sensing windings. Both the drive and sensing elements obviously have mass, and in some cases such mass can have a significant impact on the dynamic response characteristics of the structure.

Furthermore, in order to communicate electrical current to the driving coil, and to obtain induced signals from the sensing windings, conductive wires are typically glued or taped directly to the tubes or other vibrating parts of the sensor and extended therealong to the tube mounting points for distribution to an electronic control and detection part of the system. This gives rise to disadvantages in addition to mass related effects in that the wires and their attachment means are subject to detachment as the tubes are vibrated during operation. Furthermore, in some cases the conductivity of the conductors may even be influenced by the temperature of the material flowing through the tubes.

It is well known that in systems in which the sensing tube is driven about one oscillating "axis" (drive mode) and the Coriolis forces induce oscillation about another "axis" (Coriolis mode), the structure will exhibit resonance characteristics in the drive mode that are different from the resonance characteristics in the Coriolis mode. One of such characteristics is that the natural frequencies of the two modes are different. If is to be understood that some tube configurations, such as the helical or quasi-helical loop devices of the type disclosed in the above identified copending applications, do not have definable straight-line axes of oscillation.

In any given tube structure the relationship between the natural frequency of the drive mode ($W_D$) and the natural frequency of the Coriolis mode ($W_C$) are predetermined by the particular vibrational characteristics of the structure. Such a relationship can be graphically expressed in a Coriolis mode resonance diagram of the type shown in FIG. 6 of the drawing wherein the mechanical amplification factor H is plotted against the ratio of $W_D$ to $W_C$. As indicated, the amplification factor (proportional to the sensitivity to mass flow rate) of the device is determined by the point at which the drive frequency $W_D$ falls on the curve C. However, since the frequencies $W_D$ and $W_C$ will change somewhat with changes in density of the mass flow through the tube, it can be expected that the sensitivity of the device will also change with density. This is undesirable because it can lead to substantial inaccuracies where large swings in density are encountered.

Attempts have been made in the prior art to provide a density independent structure by tailoring the sensor structure so that it has a drive frequency that is remote from the Coriolis frequency and thus falls within the shaded portion S of the curve C (FIG. 6). The U-tube devices disclosed in the Smith U.S. Pats. Nos. 4,187,721, 4,252,028, 4,422,338, and 4,491,025 have used such technique. Although a degree of density independence is achieved using such an approach, it results in a device which has a relative low sensitivity characteristic. Consequently, devices of this type are not suitable for use with low mass materials such as gases, for example.

Other attempts to improve sensitivity have involved the coice of various configurations which are inherently more sensitive than the Smith U-tube configurations. For example, see the U.S. Pat. No. 4,127,028 to Cox et al, wherein sensitivity was increased by causing the legs of a U-tube to converge in the region near the attachment points. Although providing a degree of improvement over the U-tube approach, the Cox device was subject to other limitations and has not met with practical success.

Although the above stated disadvantages can usually be tolerated in larger conduit applications, in flow meters for measuring small flow rates and utilizing small diameter tubing, e.g., one-eighth inch, one-sixteenth inch, etc., the mass of the driving coils and sense coils, and their associated wires, etc., comprises an appreciable fraction of the conduit mass. This tends to upset and deleteriously influence the conduit's vibrational and dynamic characteristics, sometimes to the point where it is impossible to build acceptable meters with the tube diameters of the stated size.

SUMMARY OF THE PRESENT INVENTION

It is therefore an object of the present invention to provide a novel mass flow sensor device in which the sensitivity is improved by eliminating the need to attach sensing and driving coils and their associated connecting wires to the flow carrying conduits or other vibrating parts of the mass flow rate sensor device.

Another object of the present invention is to provide an improved dual-tube device of the type described wherein the tube mass is reduced to its lowest practical level, and only light weight magnets and attaching fixtures are affixed thereto for accomplishing drive and sensing functions.

Still another object of the present invention is to provide a device of the type described wherein all drive and sensing windings, as well as associated connecting wires, are carried directly by the tube supporting casing.

Another object of the present invention is to provide an improved dual-tube device of the type described wherein the tube mass is reduced to its lowest practical level and resilient means is added to increase the sensitivity of the device without substantially affecting the mass of the structure.

Still another object of the present invention is to provide a device of the type described wherein means is added to the tube structure to move the drive mode natural frequency ($W_D$) closer to the Coriolis mode frequency ($W_C$) without changing the Coriolis frequency.

Briefly, a preferred embodiment includes a dual-tube structure in which each tube is formed into a full loop and the loops are connected either in series or in parallel flow relationship. Preferably, the loops are elongated in the direction of the external flow line. Light weight magnets are affixed to the tubes, a drive coil associated with two of the magnets is disposed between the tubes at a point midway between the loop extremities and opposite the cross-over points of the loops, and sensor windings associated with the remaining magnets are placed between the loops at each extremity thereof. No electrical connections need be carried by either loop.

In accordance with the present invention, the sensitivity of the device may be further improved by coupling a resilient linking member between the tubes at their drive points. The linking member has the effect of increasing the spring constants of the loops in the drive mode without affecting the spring constants in the Coriolis mode.

Among the advantages of the present invention is that it provides a device having increased sensitivity to mass flow rate, and increased utility in that the measurement range of the device is broadened to include the ability to measure small mass flow rates; as in the case of low liquid flow rates or gases.

Another advantage of the present invention is that the device may be implemented using tubing of very small diameter.

These and other objects and advantages of the present invention will no doubt become apparent to those skilled in the art after having read the following detailed description of the preferred embodiments illustrated in the several figures of the drawing.

IN THE DRAWING

FIG. 1 is a partially broken longitudinal side view illustrating a dual loop mass flow rate sensor in accordance with the present invention;

FIG. 2 is a partially broken top view thereof;

FIG. 7 is a partially broken cross section taken along the line 3—3 of FIG. 2 further showing the addition of a resilient linking member in accordance with the present invention;

FIG. 8 illustrates a first alternative embodiment of a resilient member;

FIG. 9 illustrates a second alternative embodiment of a resilient member;

DETAILED DESCRIPTION OF THE PREFERRED EMBODIMENTS

Figure 3:
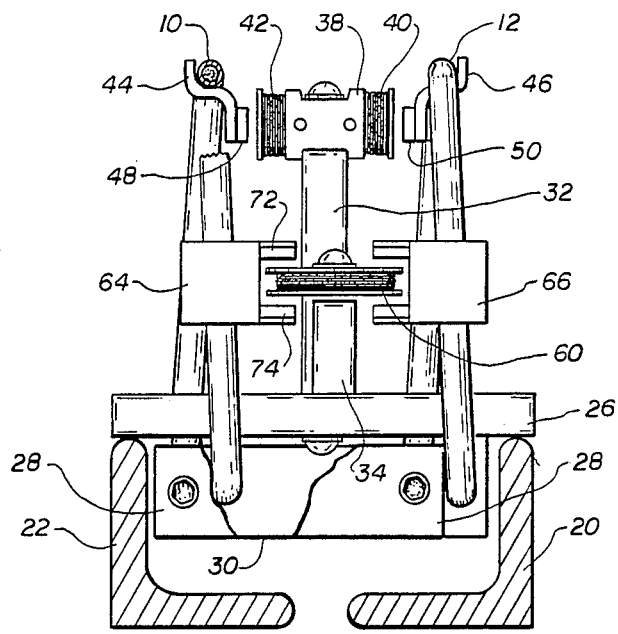
FIG. 3 is a partially broken cross section taken along the line 3—3 of FIG. 2.

Referring now to FIGS. 1–3 of the drawing, there are shown in partially broken side, top and cross sectional views, a presently preferred embodiment of a Coriolis mass flow rate sensor including a pair of elongated, generally helically configured tubes 10 and 12 of the type disclosed in the above-referenced copending application, Ser. No. 777,707. The tubes are supported by a base 14 comprised of input and output flow splitters 16 and 18 coupled together by a pair of longitudinal stiffener members 20 and 22 which are generally L-shaped in transverse cross section.

The ends of the tube 10 and 12 are connected to flow splitters 16 and 18 by suitable stress relieving fixtures 24 and are typically welded or brazed thereto. Attached to tubes 10 and 12, and rigidly affixed thereto at suitable points proximate the loop extremities, are "isolation" plates 28 and 30 which serve to define boundaries at which the tubes are torqued and deflected by driving forces and induced Coriolis forces.

Welded to the top members 20 and 22 is a cross plate 26. Secured to plate 26 by means of suitable bolts, screws or other fasteners is a drive coil mount 32 and a pair of sensor coil support arms 34 and 36. Attached to the top of mount 32 is an electromagnetic driver means 38 including a pair of magnetic windings 40 and 42 wound about an axis extending transverse to the axes of the proximate portions of the tubes (at drive points D1 and D2). Disposed opposite the ends of driver means 38, and affixed to tubes 10 and 12 by suitable lightweight brackets 44 and 46, are lightweight permanent magnets 48 and 50 which are attracted or repelled by magnetic fields developed by drive currents in the windings 40 and 42. Brackets 44 and 46 are affixed to tubes 10 and 12 respectively, by welding or brazing at the drive points D1 and D2.

Attached to the support arms 34 and 36 are a pair of sensor windings 60 and 62 which are disposed between the extremities of the loops formed by tubes 10 and 12. The windings 60 and 62 are wound about axes extending substantially parallel to tangents to the loop ends of the tubes at their sense points S1–S2 and S3–S4. Affixed to each of the tubes immediately adjacent windings 60 and 62 are light-weight brackets 64–70 each of which carry a pair of light-weight magnets 72 and 74 (see FIG. 3) that are disposed on opposite sides of an arcuate portion of the windings 60. It will be appreciated that with magnets 72 and 74 appropriately polarized to establish a magnetic field extending between them, and cut by the conductors of winding 60, any motion of the loop extremities perpendicular to the winding axis and perpendicular to the sensing device axis will cause proportional EMF to be developed in the winding 60 resulting in a current flow therethrough which is a function of the relative velocity of motion between the respective loop extremities at the sense points S1–S2 and S3–S4.

The sensing windings 62 and associated tube carried magnets, disposed at the other loop extremity, are similarly configured.

In operation, with opposing alternating drive current applied to the windings 40 and 42 of driver means 38, the tube drive points D1 and D2 will be caused to move toward and away from each other in responsive motion and, as is well explained in the prior art, mass flowing through the tubes will cause Coriolis force couples to be developed in each loop, tending to twist each loop, and alternately expanding and contracting the dynamic separation between the respective loop extremities caused in the first instance by the drive forces. The Coriolis motion is thus superimposed upon the drive motion. Accordingly, one pair of loop extremities will be out of phase relative to the other pair of loop extremities by a phase angle that is a function of the rate of mass flow through the tubes 10 and 12. Relative velocity of the separational motion at the opposite ends of the loops is sensed by the windings 60 and 62 and fed to appropriate detection circuitry which measures the phase difference between the two signals as an indication of the mass flow rate through the dual-loop sensor.

Figure 4:
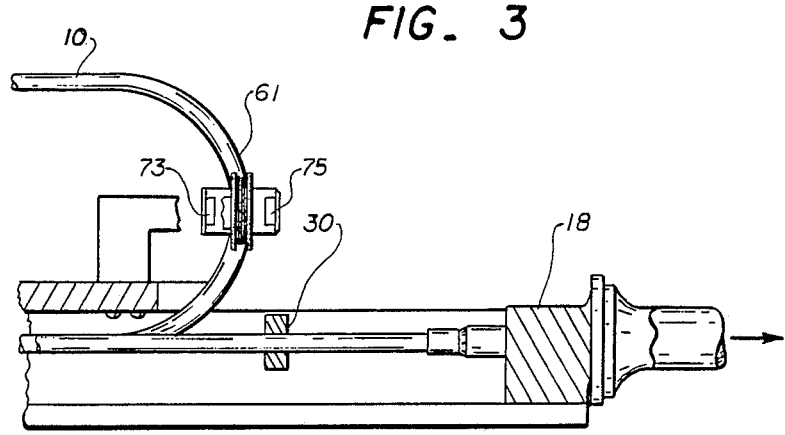
FIG. 4 is a broken partial elevation taken generally along the longitudinal center line of the device and illustrating an alternative sensing winding and magnet embodiment.

In FIG. 4 an alternative sensor configuration is depicted in part to show that the magnets 73 and 75 and their associated field can be rotated 90° relative to that of the previously described embodiment so long as the corresponding sensing winding 61 is likewise rotated. Note that in this case the axis of winding 61 is parallel to the direction of the magnetic field created between magnets 73 and 75 and orthogonal to tangents to the tubes 10 and 12 at the points of attachment of the magnets.

Figure 5:
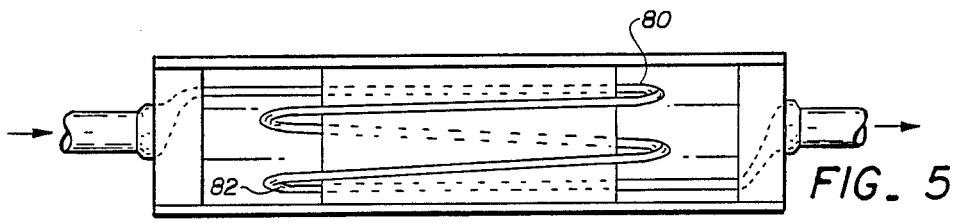
FIG. 5 is an illustrative schematically depicting a serially configured dual loop alternative embodiment.

FIG. 5 is included to show that as an alternative to the parallel flow embodiment depicted in FIGS. 1–3, a dual-loop serial flow embodiment is also possible. As indicated, flow material passing through the first loop 80 then passes through the second loop 82 before being emitted from the sensor structure. For simplicity, the driving and motion sensing components depicted in FIGS. 1–4 have been omitted.

Referring now to FIGS. 7–10 additional means that may be added to improve the sensitivity of the above depicted embodiments are illustrated. Specifically referring now to FIG. 7, positioned immediately above the drive 38 and rigidly affixed to brackets 44 and 46 which are welded or brazed to the tubes at drive points D1 and D2 is a resilient linking member 52 which exerts resilient restoring forces to the drive points during the driving operation.

Note that although shown as a curved leaf spring, the member 52, could take any suitable configuration capable of exerting restorative forces to the tubes at their drive points. Examples of such alternatives are the coil spring 54 shown in FIG. 8, the loop spring 56 shown in FIG. 9, and the adjustable leaf spring assembly 58 shown in FIG. 10.

The assembly 58 includes a pair of elongated leaf spring members 80 and 82 each having a slot 84 extending along the length thereof to provide passages through which a pair of clamp screws 86 and 88 pass. The mid-point of each spring member is affixed to the drive point of one of the tubes 10 and 12 by a suitable bracket 90 which is welded to brazed to both tube and spring member. Slidably disposed near each end of the assembly is a three-piece clamp block 92 that is selectively movable towards the middle of the assembly by means of a lead screw 94 which is oppositely threaded at each end and mates with a tapped hole in each block 92. By loosening the screws 86 and 88 and turning the lead screw 94, the blocks 92 can be positioned as required to cause the assembly 58 to have any desired spring constant within a predetermined range. This allows the spring constant of the sensor's drive mode to be "tuned" to meet particular specification. Once the blocks 92 are set in position, they may be locked in place by tightening the screws 86 and 88.

Figure 11:
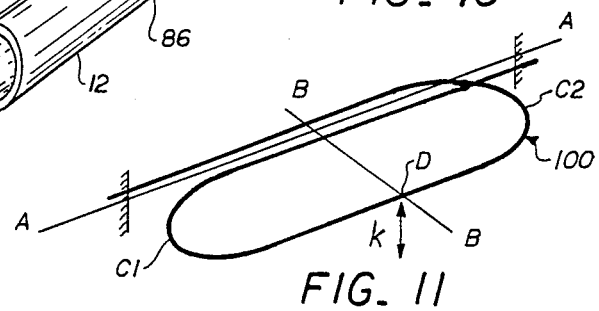
FIG. 11, 12 and 13 are diagrams schematically illustrating three types of flow tubes that may be modified in accordance with the present invention.

Although the device described above is fully functional without the resilient member 52, the sensitivity thereof has been substantially improved by the addition of the linkage member. An explanation of why such addition causes the device to have improved operational characteristics follows:

The oscillatory characteristics of each tube of the device illustrated in FIGS. 1–5 can be generally represented by the diagram of FIG. 11 wherein it is assumed that for purposes of illustration the tube 100 lies in a plane (although this is not strictly correct in that the tube is helically configured and thus cannot lie in a plane), and in the drive mode oscillates about an imaginary axis A—A, while in the Coriolis mode oscillates about an imaginary axis B—B. These axis are said to be imaginary because no definable single axis of oscillation exists for a helically configured structure of the type illustrated.

Without outside influence, the tube will, in the drive mode, behave as a spring having a natural frequency $$W_D = \sqrt{K1/M1}$$

where
K1 is the effective spring constant of the loop in the drive mode, and
M1 is the effective loop mass participating in the drive mode vibration.

Similarly, in the Coriolis mode the tube 100 will have a natural frequency of $$W_C = \sqrt{K2/M2}$$

where
K2 is the effective spring constant of the loop in the Coriolis mode, and
M2 is the effective loop mass participating in the Coriolis mode vibration.

Note that since the Coriolis mode oscillation is about the axis B-B, and the drive mode oscillation is about the axis A—A which is orthogonal to axis B—B, any spring forces operating on the loop at the drive point D (along the axis B—B), and tending to affect oscillations solely about the axis A—A, will have substantially no effect on the Coriolis spring constant. Accordingly, by applying an additional resilient member to the loop 100 at the drive point D, the natural frequency $W_D$ of the loop can now be expressed as $$W_D = \sqrt{(K1+Ks)/M1}$$

Where Ks is the spring constant of the resilient member. However, it is important that the resilient member have a substantially larger spring constant in the drive direction than in any other direction so as to have no material effect on the Coriolis spring constant. The Coriolis frequency $W_C$ must remain substantially unchanged.

Figure 12:
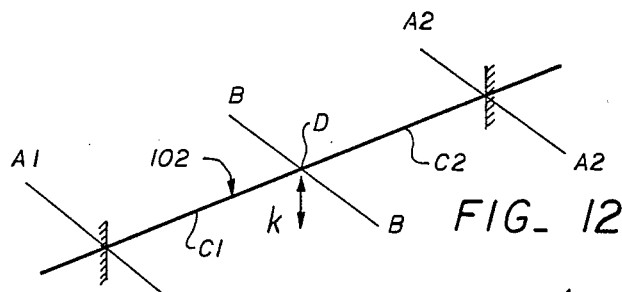
Figure 13:
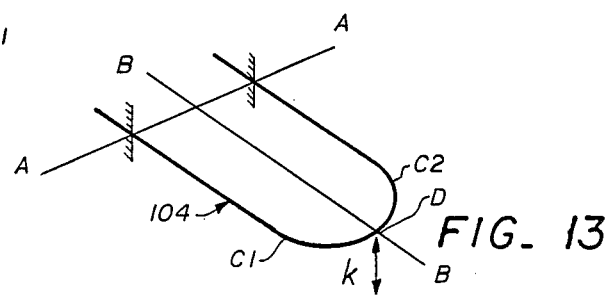

A similarly analysis applies to straight tube devices such as is illustrated at 102 in FIG. 12 and U-tube devices as shown at 104 in FIG. 13.

Figure 6:
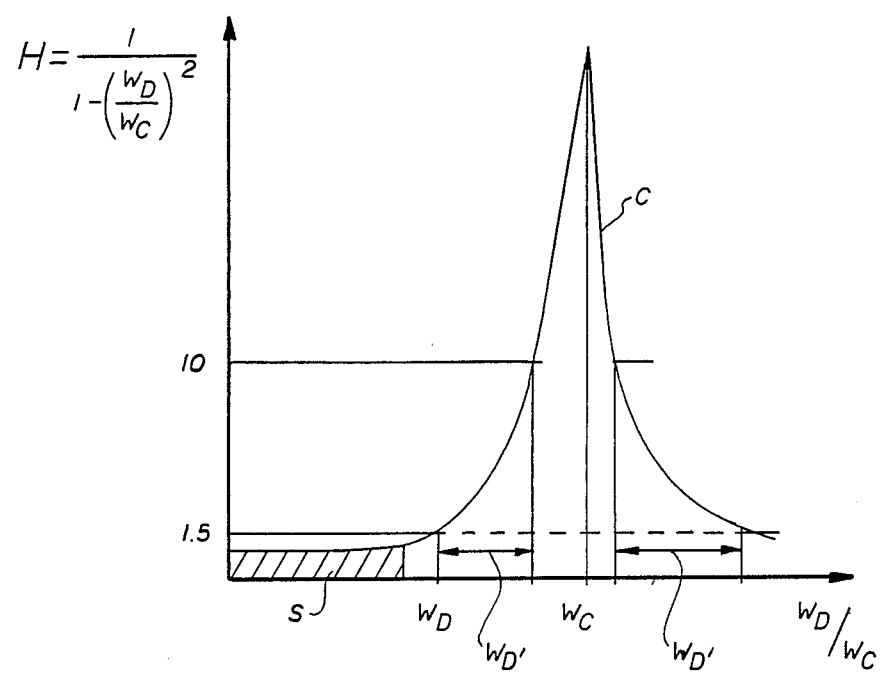
FIG. 6 is a diagram illustrating a typical resonance characteristic of a Coriolis flow meter.
Figure 10:
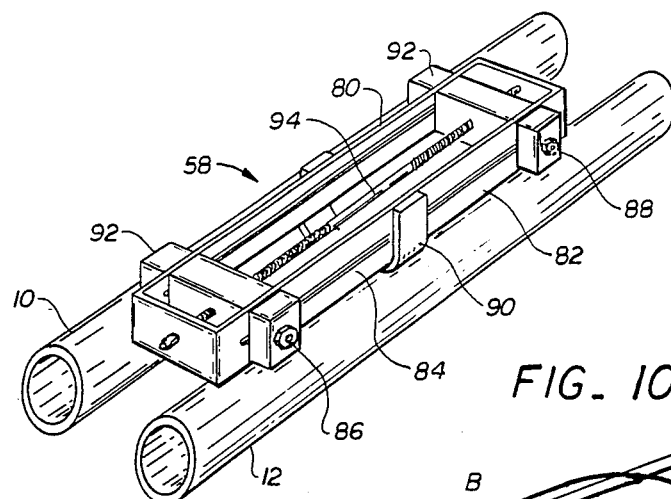
FIG. 10 illustrates a third alternative embodiment of a resilient member.

It will thus be appreciated that the same will apply to a similar second loop coupled to the loop 100 by the member applying the spring force, and as long as the mass of the resilient coupling member is small relative to the mass of the tubes, the only characteristic of the tubes that is changed will be that $W_D$ will be moved closer in frequency to $W_C$ than it would be if the linkage member was absent. As a consequence, as illustrated in FIG. 6, the mechanical amplification factor will be increased. It thus follows that the tube sensitivity to mass flow will likewise be increased. Thus, for a given mass flow, greater signal levels and phase shifts in the signals output by the sensors 60 and 62 will be experienced, thus given rise to improved signal-to-noise ratio, sensitivity and accuracy. Furthermore, the device will be useful at lower mass flow rates than it would have been without the improvement.

According to the present invention, through proper choice of the spring characteristics of the resilient member 52, the natural frequency of oscillation of the dual-loop structure in its drive mode can be predetermined as it relates to the natural frequency of oscillations of the structure in the Coriolis mode. For example, referring again to FIG. 1 of the drawing, it will be understood that absent the use of resilient member 52, the natural frequency of the structure in the drive mode would normally be selected to be substantially less than the Coriolis frequency $W_C$. However, by adding the resilient member 52, the natural drive frequency of the structure can be moved closer to the Coriolis frequency. It will be appreciated that it is not desirable to move $W_D$ too close to $W_C$ or instability will result. It has been found that a dynamic amplification factor in the range of 1.5 to 10 is appropriate and can be selected by appropriate choice of the resilient member 52. It should also be pointed out that $W_D$ can be shifted to a frequency greater than that of $W_C$ and have the same result.

Although the present invention has been described above relative to a dual-loop sensor device, it is to be understood that the invention can also be applied to devices employing U-tubes, straight tubes or any other configurations in which Coriolis oscillation of at least one tube occurs. Furthermore, the present invention could be applied to devices employing drive means and Coriolis sensing elements other than those described above. Moreover, it is anticipated that other emdodiments and/or alterations or modifications thereof will become apparent to those skilled in the art after reading this disclosure. Accordingly, it is intended that the following claims be interpreted to cover all such alternatives, alterations or modifications as fall within the true spirit and scope of the invention.

I claim:

1. A dual tube flow rate sensor comprising:
   a base;
   a first length of tubular conduit configured to form a first generally helically wound loop having crossing portions which extend in opposite directions, said first conduit being affixed to and being carried by said base and adapted to conduct a flow of material therethrough;
   a second length of tubular conduit configured to form a second generally helically wound loop having crossing portions which extend in opposite directions, said second loop being disposed in aligned spaced apart relationship to said first loop with segments of said second loop extending substantially parallel to corresponding segments of said first loop;
   first magnetic means affixed to said first loop at a first drive point opposite the crossing portions thereof;
   second magnetic means affixed to said second loop at a second drive point opposite the crossing portions thereof;
   electromagnetic drive means carried by said base and disposed between said first and second magnetic means and operative to interact therewith to drive corresponding portions of said first and second loops alternately toward and away from each other;
   third magnetic means affixed to said first loop at a point on one side of said first magnetic means and operative to create a first magnetic field having a predetermined direction relative to the adjacent portion of said first loop;
   fourth magnetic means affixed to said second loop on one side of said second magnetic means and at a point corresponding to the position of said third magnetic means, said fourth magnetic means being operative to create a second magnetic field directed parallel to said first magnetic field; and
   a first sensor winding wound about a first axis extending parallel to the directions of said first and second magnetic fields, said first winding being carried by said base and disposed to have arcuate segments thereof passing through said first and second magnetic fields;
   whereby drive forces applied by said drive means cause said first and second loops to move relative to each other thereby moving said third and fourth magnetic means relative to each other and to said first winding with the result that first electrical signals are induced in said first winding, said first electrical signals having a characteristic from which the mass flow rate of material flowing through said conduits can be determined.

2. A dual tube mass flow rate sensor as recited in claim 1 and further comprising:
   fifth magnetic means affixed to said first loop on another side of said first magnetic means and operative create a third magnetic field having a predetermined direction relative to the adjacent portion of said first loop;
   sixth magnetic means affixed to said second loop on another side of said second magnetic means and at a point corresponding to the position of said fifth magnetic means, said sixth magnetic means being operative to create a fourth magnetic field directed parallel to said third magnetic field; and
   a second sensor winding wound about a second axis extending parallel to the directions of said third and fourth magnetic fields, said second winding being carried by said base and having arcuate sections thereof passing through said third and fourth magnetic fields;
   whereby said drive forces also cause second electrical signals to be induced in said second windings, the phase relationship of said first and second electrical signals being proportional to the magnetic flow rate of material passing through said tubes.

3. A dual tube mass flow rate sensor as recited in claim 2 wherein said first, second, third and fourth magnetic fields are respectively directed substantially parallel to tangents to said loops at the points at which the corresponding field creating magnetic means is affixed, and wherein said first and second axes extend substantially parallel to the directions of the magnetic fields through which the corresponding windings pass.

4. A dual tube mass flow rate sensor as recited in claim 3 wherein said first and second loops are connected to form parallel material flow paths between a common inlet and a common outlet.

5. A dual tube mass flow rate sensor as recited in claim 3 wherein said first and second loops are serially connected to form a single material flow path extending between an inlet and outlet.

6. A dual tube mass flow rate sensor as recited in claim 2 wherein said first, second, third and fourth magnetic fields are respectively directed substantially orthogonal to tangents to said loops at the points at which the corresponding field creating magnetic means is affixed, and wherein said first and second axes extend substantially parallel to the directions of the magnetic fields through which the corresponding windings pass.

7. A dual tube mass flow rate sensor as recited in claim 6 wherein said first and second loops are connected to form parallel material flow paths between a common inlet and a common outlet.

8. A dual tube mass flow rate sensor as recited in claim 6 wherein said first and second loops are serially connected to form a single material flow path extending between an inlet and an outlet.

9. A dual tube mass flow rate sensor as recited in claim 1 and further comprising:
   linkage means resiliently coupling said first and second loops at said first and second drive points so as to cause the natural frequency of the loops in their drive mode of oscillation to be shifted closer in frequency to the natural frequency of the loops in their Coriolis mode of oscillation thereby enhancing the mechanical amplification factor of the device and hence the sensitivity of the device to mass flow rate.

10. A dual tube mass flow rate sensor as recited in claim 9 wherein said linkage means includes a leaf spring device each end of which is coupled to the drive point of one of said loops.

11. A dual tube mass flow rate sensor as recited in claim 10 wherein the mass of said leaf spring device is less then than 10 percent of the mass of said loops.

12. A dual tube mass flow rate sensor as recited in claim 9 wherein said linkage means includes a coil spring device each end of which is coupled to the drive point of one of said loops.

13. A dual tube mass flow rate sensor as recited in claim 12 wherein the mass of said coil spring device is less then ten percent of the mass of said loops.

14. A dual tube mass flow rate sensor as recited in claim 9 wherein said linkage means includes a hoop spring device each end of which is coupled to the drive point of one of said loops.

15. A dual tube mass flow rate sensor as recited in claim 14 wherein the mass of said hoop spring device is less then ten percent of the mass of said loops.

16. A dual tube mass flow rate sensor as recited in claim 9 wherein the addition of the linkage means causes the sensor to have a dynamic amplification factor in the range of 1.5 to 10.

17. A dual tube mass flow rate sensor as recited in claim 9 wherein said linkage means is adjustable to have a selectively variable spring constant.

18. A dual tube mass flow rate sensor as recited in claim 17 wherein said linkage means includes a pair of elongated spring members the mid-points of which are respectively affixed to one of said loops at said drive points, and means selectively positionable along each end portion of said members to determine the spring constant of said linkage means.

* * * * *